United States Patent [19]

Furukawa et al.

[11] Patent Number: 5,378,561
[45] Date of Patent: Jan. 3, 1995

[54] SECONDARY CELL

[75] Inventors: Nobuhiro Furukawa; Masahisa Fujimoto; Noriyuki Yoshinaga, all of Osaka; Koji Ueno, Hyogo, all of Japan

[73] Assignee: Sanyo Electric Co., Ltd., Osaka, Japan

[21] Appl. No.: 937,728

[22] Filed: Sep. 1, 1992

[30] Foreign Application Priority Data

Oct. 8, 1991 [JP] Japan ................................. 3-260738

[51] Int. Cl.[6] .................... H01N 10/40; C01B 31/07
[52] U.S. Cl. ................................. 429/218; 423/448; 423/449.1
[58] Field of Search ........................................... 429/218

[56] References Cited

U.S. PATENT DOCUMENTS 4,668,595  5/1987  Yoshino et al. .................. 429/194

*Primary Examiner*—David B. Springer
*Attorney, Agent, or Firm*—Wegner, Cantor, Mueller & Player

[57] ABSTRACT

The present invention provides a secondary cell with an enlarged capacity, therefore enlarging a discharge capacity as well as improving charge/discharge cycle characteristics. The secondary cell has a carbon material for a negative electrode, wherein the spacing of (002) planes $d_{002}$, a true density, a crystallite size in the direction of c axis Lc, a and specific surface area of the carbon material are restricted to ranges of 3.39Å to 3.62Å, 1.70 g/cc to 2.20 g/cc, 10Å to 50Å, and 2 m²/g to 50 m², respectively. The carbon material is selected from a carbon material group consisting of needle cokes, pitch cokes, and coke derived from furfuryl alcohol.

33 Claims, 9 Drawing Sheets

SECONDARY CELL

BACKGROUND OF THE INVENTION (1) Field of the Invention

The present invention relates to a secondary cell having lithium as an active material and non-aqueous electrolyte or the like, more particularly, to a new material for an electrode thereof.

(2) Description of the Related Art

Recently, researches of secondary cells having lithium as an active material has been actively pursued as they show great promise due to their high energy density.

A success or a failure of the study depends on performance of the negative electrode of the secondary cell. Conventionally, lithium metal, lithium alloy and the like are utilized for the negative electrode.

In a secondary cell having a lithium metal negative electrode, its low discharge efficiency, i.e. 50% more or less, makes it difficult to obtain efficient charge/discharge cycle characteristics. Also in the course of the charge/discharge cycles, dendrites crystallize on the surface of lithium, causing an internal short circuit. In a cell having a lithium alloy negative electrode, pulverization of lithium alloy occurs in the course of the charge/discharge cycles, which makes it difficult to improve the charge/discharge cycle characteristics remarkably.

A secondary cell having a negative electrode including intercalation compounds of graphite and lithium is proposed in Japanese Patent Publication No. 57-208079. In such a cell, lithium ions are absorbed into carbon's crystalline structure, thereby retaining substantially 100% charge/discharge efficiency as well as circumventing the problem of the pulverization. However, because such a cell has only a small capacity, a method of its enlargement for high energy density is still sought.

Heat-treated cokes or polymers have recently attracted considerable attention. For instance, in Japanese Laid-open Patent Application No. 63-121259, a property of the cell was discussed by studying some properties of cokes such as density, crystallite size in the direction of c axis Lc and specific surface area S. In repetition of the tests, it was learned that a correlation between the density and the spacing of (002) planes $d_{002}$ was also an important factor besides the aforementioned three properties when enlarging the cell capacity.

In Japanese Laid-open Patent Application No. 63-114056, a cell having heat-treated polymers was discussed by studying the correlation among a H/C specific, the crystallite size in the direction of c axis Lc, and the spacing of (002) planes $d_{002}$. However, the discussion did not lead to a definite correlation between the density and the spacing of (002) planes $d_{002}$, therefore, a method to enlarge the cell capacity was not successfully disclosed therein.

In summary, the conventional secondary cells having lithium as the active material retain an insufficient capacity at the negative electrode, making it impossible to produce a secondary cell with an increased capacity.

SUMMARY OF THE INVENTION

The present invention has an object to provide a secondary cell with an enlarged capacity, therefore enlarging discharge capacity as well as improving the charge/discharge cycle characteristics.

The object is fulfilled by a secondary cell having a carbon material for an electrode, wherein the spacing of (002) planes $d_{002}$ and the true density of the carbon material are restricted to ranges of 3.39Å to 3.62Å and 1.70 g/cc to 2.20 g/cc, respectively.

The object is also fulfilled by a secondary cell having a carbon material for an electrode which is produced by the process comprising a first step of heat treatment of the carbon material, of which the spacing of (002) planes $d_{002}$ and true density are restricted to ranges of 3.39Å to 3.62Å and 1.70 g/cc to 2.20 g/cc, respectively, and a second step of pulverizing the carbon material in ambient gas after heat treatment.

The carbon material may be utilized for a negative electrode.

A crystallite size in the direction of c axis Lc of the carbon material may be restricted to a range of 10Å to 50Å.

A specific surface area of the carbon material may be restricted to a range of 2 m$^2$/g to 50 m$^2$/g.

The carbon material may be selected from a carbon material group consisting of needle cokes, pitch cokes, and furfuryl alcohol.

In the course of the study, it was confirmed from experiments that restricting the ranges of the spacing of (002) planes $d_{002}$ and true density of the carbon material in the electrode to 3.39Å to 3.62Å and 1.70 g/cc to 2.20 g/cc, respectively, enables the secondary cell to retain an enlarged discharge capacity as well as the improved charge/discharge cycle characteristics. This is because lithium ions were easily intercalated/desorbed into/from the crystalline structure of carbon, thereby enlarging the discharge capacity and improving the charge/discharge cycle characteristics of the cell.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

(EMBODIMENT I)

EXAMPLE 1

Figure 1:
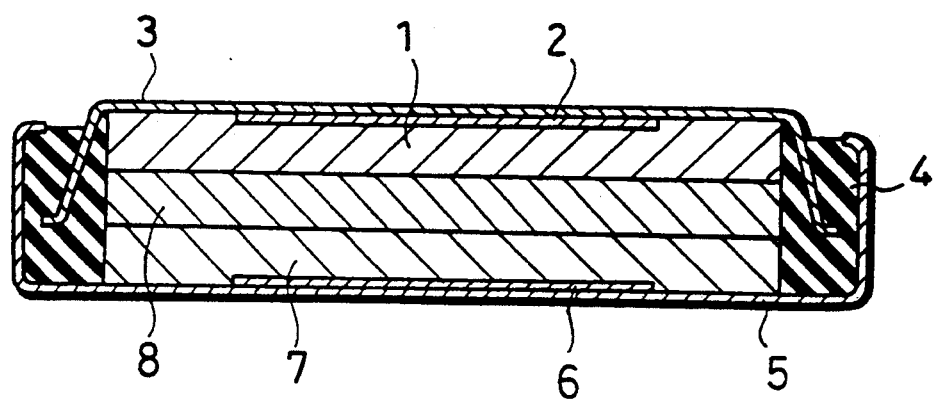
FIG. 1 is a cross section of Cell (A1) of the present invention.

The construction of a secondary cell of the present invention is described hereunder with referring to FIG. 1. A negative electrode 1 made from 50 mg of a carbon material capable of absorbing lithium is pressure-contacted on the inner surface of a negative electrode collector 2. The negative electrode collector 2 is adhered to the inner bottom surface of a negative electrode can 3 made from ferritic stainless steel(SUS430). The edge of the negative electrode can 3 is fixed on a polypropylene insulating packing 4. A positive electrode can 5 is fixed inside of the insulating packing 4. A positive electrode collector 6 is adhered to the inner bottom surface of the positive electrode can 5. A positive electrode 7 is pressure-contacted on the inner surface of the positive electrode collector 6. A separator 8 impregnated with electrolytic solution is disposed between the positive electrode 7 and negative electrode 1. The electrolytic solution was prepared by dissolving lithium perchlorate (LiPF6) as solute in propylene carbonate (PC) in the ratio of 1 mol/l. The positive electrode 7 has a larger capacity than the negative electrode 1 so that predominance of the negative electrode occurs. The cell is 24.0 mm and 3.0 mm in outer diameter and thickness, respectively.

A positive electrode 7 and negative electrode 1 were produced by the processes described hereunder.

The positive electrode 7 was produced by applying pressure to a mixture consisting of manganese oxides having lithium, acetylene black as a conducting agent, and fluorine containing resin as a binder in weight proportions 85:10:5 and by a subsequent heat treatment at 250° C to 350° C.

The negative electrode 1 was made from needle cokes (Mitsubishi Chemical Industries Ltd.: PCN) with the spacing of (002) planes $d_{002}$ of 3.49Å and the true density of 1.70 g/cc, which was heat-treated for 5 hours at 800° C. in a gaseous nitrogen flow and subsequently pulverized for 5 hours in a jet-mill.

A cell produced in this method is referred to as Cell (A1) hereinafter.

EXAMPLES 2 AND 3

Two cells were produced by the same method described in the Example 1 except for the differences in the temperatures applied thereto at heat treatment and in material properties such as the true density and spacing of (002) planes $d_{002}$ as shown in Table 1. Cells produced as above were referred to as Cells (A2) and (A3) hereinafter.

COMPARATIVE EXAMPLES 1 AND 2

Two cells were produced by the same method described in the Example 1 except for the differences in the temperatures applied thereto at heat treatment and in material properties such as the true density and spacing of (002) planes $d_{002}$ as shown in Table 1. Cells produced as above were referred to as Cells (X1) and (X2) hereinafter.

TABLE 1

| Cell | A1 | A2 | A3 | X1 | X2 |
|---|---|---|---|---|---|
| True density (g/cc) | 1.70 | 2.02 | 2.20 | 1.40 | 2.30 |
| Spacing of (002) planes $d_{002}$, (Å) | 3.49 | 3.48 | 3.42 | 3.50 | 3.42 |
| Temperature at heat treatment (°C.) | 800 | 1200 | 1500 | 600 | 1800 |

EXPERIMENT 1

A study of a correlation between the true density and the electrode capacity was carried out in Cells (A1) to (A3) of the present invention and Cells (X1) and (X2) of the comparative examples.

The cells were charged in a current of 1 mA/cm2 to the charge ending voltage of 3.6 V and discharged in a current of 1 mA/cm2 to the discharge ending voltage of 2.4 V. Electrolytic deposition of lithium on the negative electrodes was not observed when the cells were charged at the constant voltage of 3.6 V.

Figure 2:
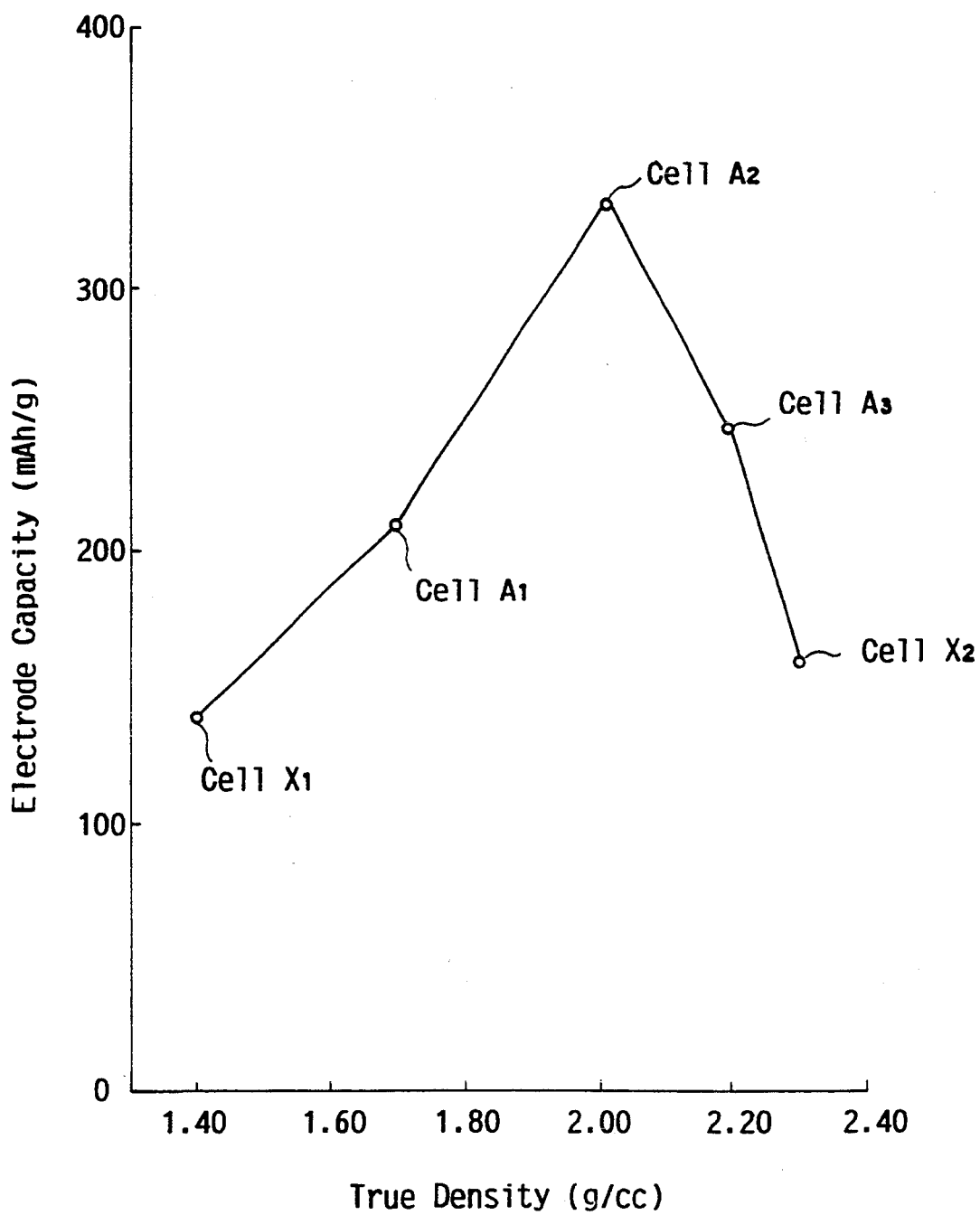
FIG. 2 is a graph showing a correlation between the true density and electrode capacity of Cells (A1) to (A3) of the present invention and Cells (X1) and (X2) of the comparative examples.

It is apparent from viewing FIG. 2 that larger discharge capacities were retained in Cells (A1) to (A3) of the present invention, each having the true density of 1.70 g/cc, 2.02 g/cc and 2.20 g/cc, respectively, compared to the Cells (X1) and (X2) of the comparative examples.

EXPERIMENT 2

A study was carried out with respect to the correlation between the true density and a change of the negative electrode discharge capacity per unit weight in response to the number of the charge/discharge cycles, or the charge/discharge cycle characteristics, in Cells (A1) to (A3) of the present invention and Cells (X1) and (X2) of the comparative examples. The cells were charged and discharged in the same current and voltage applied in the Experiment 1.

Figure 3:
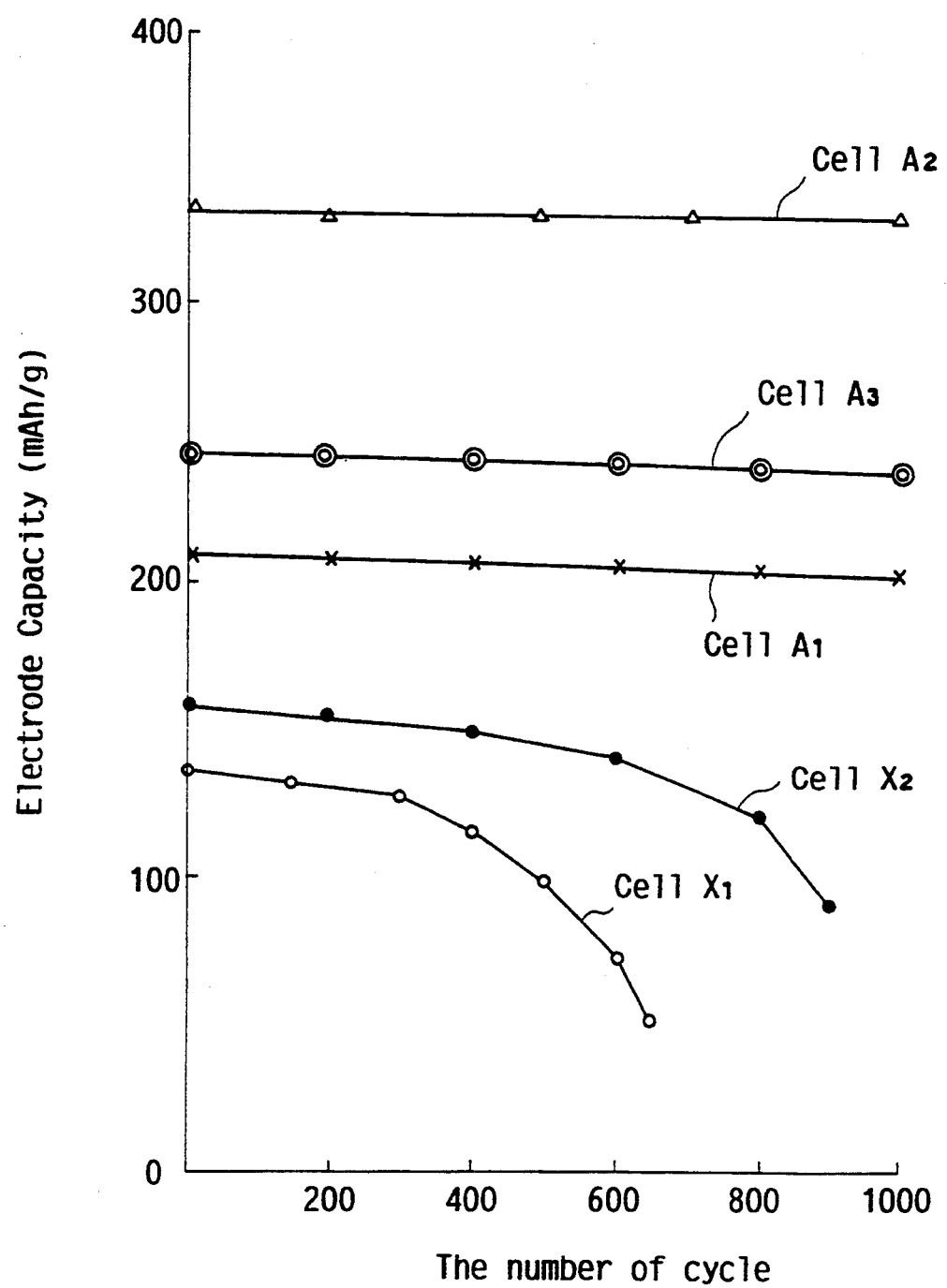
FIG. 3 is a graph showing the charge/discharge cycle characteristics of Cells (A1) to (A3) of the present invention and Cells (X1) and (X2) of the comparative examples.

It is apparent from viewing FIG. 3 that superior charge/discharge cycle characteristics were retained in Cells (A1) to (A3) of the present invention, each having the true density of 1.70 g/cc, 2.02 g/cc and 2.20 g/cc, respectively, compared by the Cells (X1) and (X2) of the comparative examples.

EXAMPLES 4 TO 6

Three cells were produced by the same method described in the Example 1 except for the differences in the carbon materials as specified as A to D and in the temperatures applied thereto at heat treatment as shown in Table 2. The cells produced as above are referred to as Cells (A4) to (A6), respectively hereinafter.

COMPARATIVE EXAMPLES 3 AND 4

Two cells were produced by the same method described in the Example 1 except for the differences in the carbon materials as specified as A to D and in the temperatures applied thereto at heat treatment as shown in Table 2. The cells produced as above are referred to as Cells (X3) and (X4), respectively hereinafter.

TABLE 2

| Cell | A4 | A5 | A6 | X3 | X4 |
|---|---|---|---|---|---|
| Spacing of (002) planes $d_{002}$, (Å) | 3.41 | 3.48 | 3.62 | 3.38 | 3.70 |
| True density (g/cc) | 2.01 | 2.02 | 2.05 | 2.00 | 2.05 |
| Temperature at | 900 | 1200 | 1500 | 700 | 1200 |

TABLE 2-continued

| Cell | A4 | A5 | A6 | X3 | X4 |
| --- | --- | --- | --- | --- | --- |
| heat treatment (°C.) | | | | | |
| Type of carbon material | A | B | C | D | C |

In Table 2, the carbon materials A, B, C, and D are pitch cokes (Mitsubishi Chemical Industries Ltd:SJ cokes), needle cokes (Mitsubishi Chemical Industries Ltd.:PCN), heat-treated furfuryl alcohol, and needle cokes (Koa Oil Co., Ltd.:SJ cokes), respectively.

EXPERIMENT 3

A correlation between the spacing of (002) planes $d_{002}$ and the electrode capacity was studied in Cells (A4) to (A6) of the present invention and Cells (X3) and (X4) of the comparative examples. The cells were charged and discharged in the same current and voltage applied in the Experiment 1.

Figure 4:
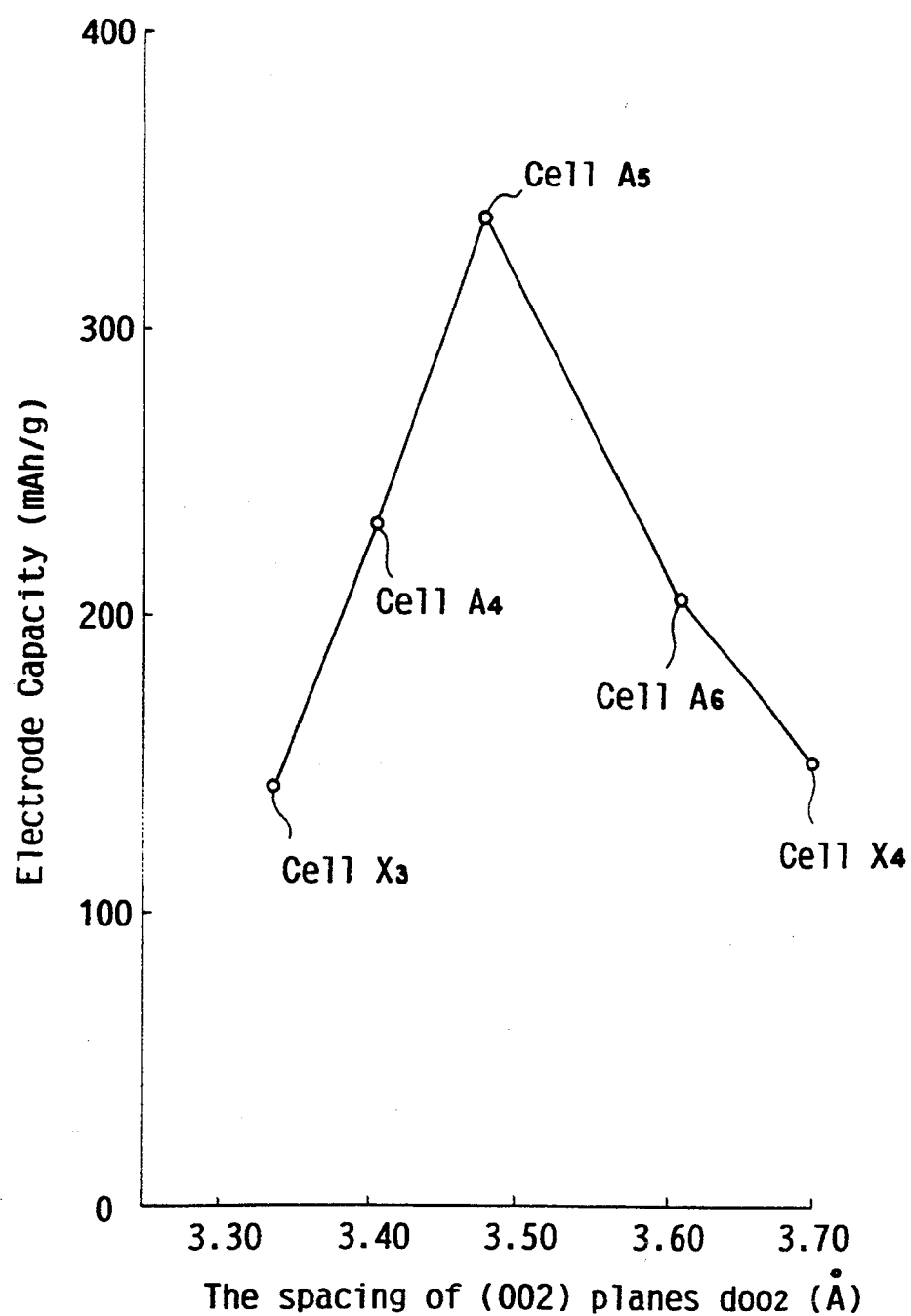
FIG. 4 is a graph snowing a correlation between the spacing of (002) planes $d_{002}$ of the carbon material and electrode capacity of Cells (A4) to (A6) of the present invention and Cells (X3) and (X4) of the comparative examples.

It is apparent from viewing FIG. 4 that larger discharge capacities were retained in Cells (A4) to (A6) of the present invention, each having the spacing of (002) planes $d_{002}$ of 3.41Å, 3.48Å, and 3.62Å, respectively, compared to the Cells (X3) and (X4) of the comparative examples.

EXPERIMENT 4

The charge/discharge cycle characteristics were studied in Cells (A4) to (A6) of the present invention and Cells (X3) and (X4) of the comparative examples. The cells were charged and discharged in the same current and voltage applied in the Experiment 1.

Figure 5:
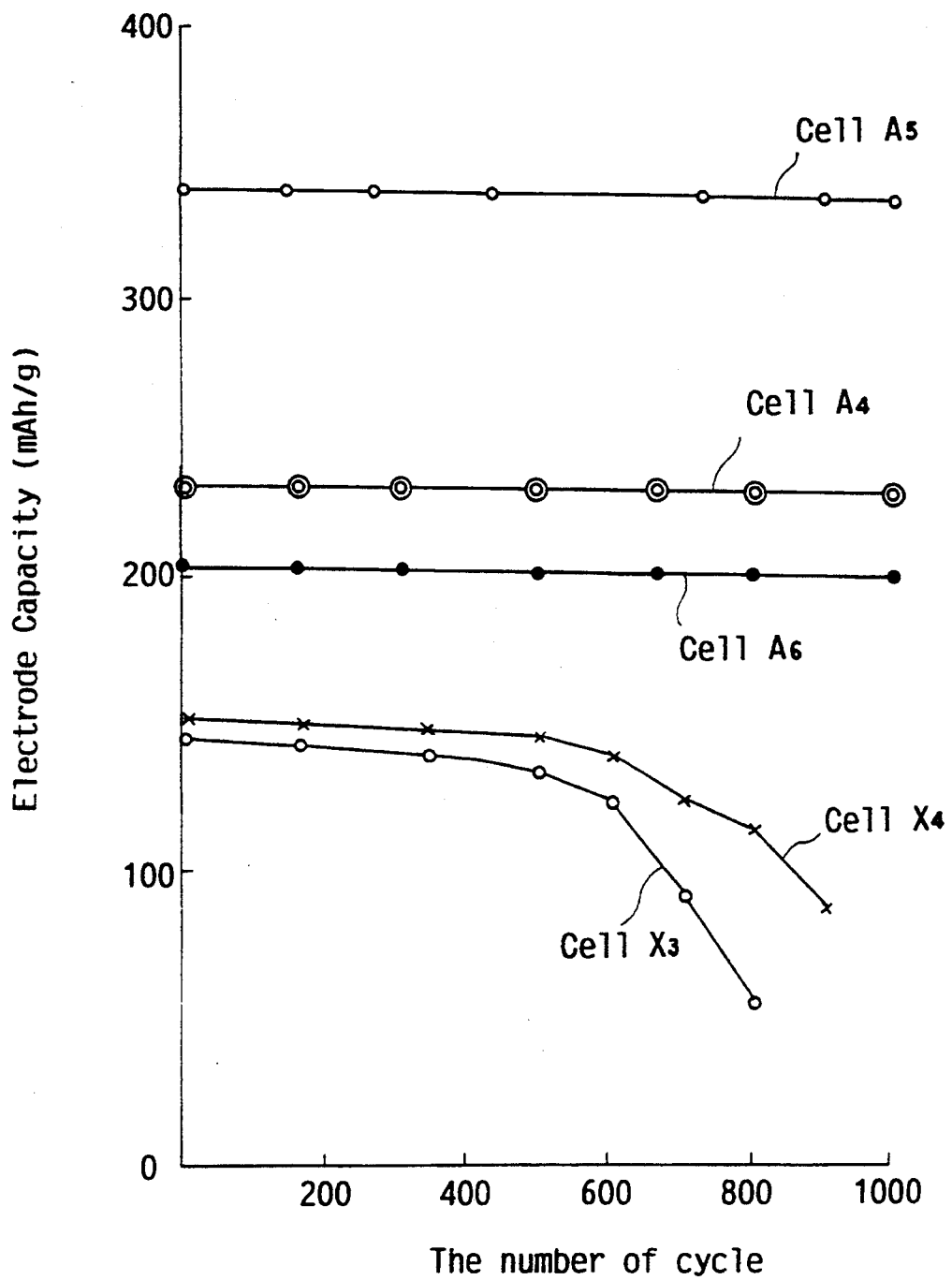
FIG. 5 is a graph showing the charge/discharge cycle characteristics of Cells (A4) to (A6) of the present invention and Cells (X3) and (X4) of the comparative examples.

It is apparent from viewing FIG. 5 that superior charge/discharge cycle characteristics were retained in Cells (A4) to (A6) of the present invention, each having the spacing of (002) planes $d_{002}$ of 3.41Å, 3.48Å, and 3.62Å, respectively, compared with the Cells (X3) and (X4) of the comparative examples.

CONCLUSION OF EXPERIMENTS 1 TO 4

From the results of the Experiments 1 to 4, it was confirmed that not only a larger discharge capacity was obtained but also the charge/discharge cycle characteristics were improved in the secondary cell of the present invention, wherein ranges of the spacing of (002) planes $d_{002}$ and true density of the carbon material used for the negative electrode were restricted to 3.39Å to 3.62Å and 1.70 g/cc to 2.20 g/cc, respectively.

(EMBODIMENT II)

EXAMPLES 1-5

Five cells were produced by the same method described in the Example 1 of the Embodiment I except for the differences in properties of the carbon material such as crystallite size in the direction of c axis Lc, the true density, and spacing of (002) planes $d_{002}$ as shown in Table 3 and in the temperatures applied thereto at heat treatment.

The cells produced as above are referred to as Cells (B1) to (B5), respectively hereinafter.

TABLE 3

| Cell | B1 | B2 | B3 | B4 | B5 |
| --- | --- | --- | --- | --- | --- |
| Crystallite size in the direction of c axis Lc (Å) | 6 | 15 | 22 | 50 | 90 |
| True density (g/cc) | 2.02 | 2.01 | 2.02 | 2.01 | 2.02 |
| Spacing of (002) planes $d_{002}$ (Å) | 3.48 | 3.49 | 3.48 | 3.47 | 3.48 |
| Hours for heat treatment (hr) | 1 | 3 | 5 | 7 | 10 |

EXPERIMENT 1

The correlation between the crystallite size in the direction of c axis Lc and the electrode capacity was studied in Cells (B1) to (B5) of the present invention. The cells were charged and discharged in the same current and voltage applied in the Experiment 1 of the Embodiment I.

Figure 6:
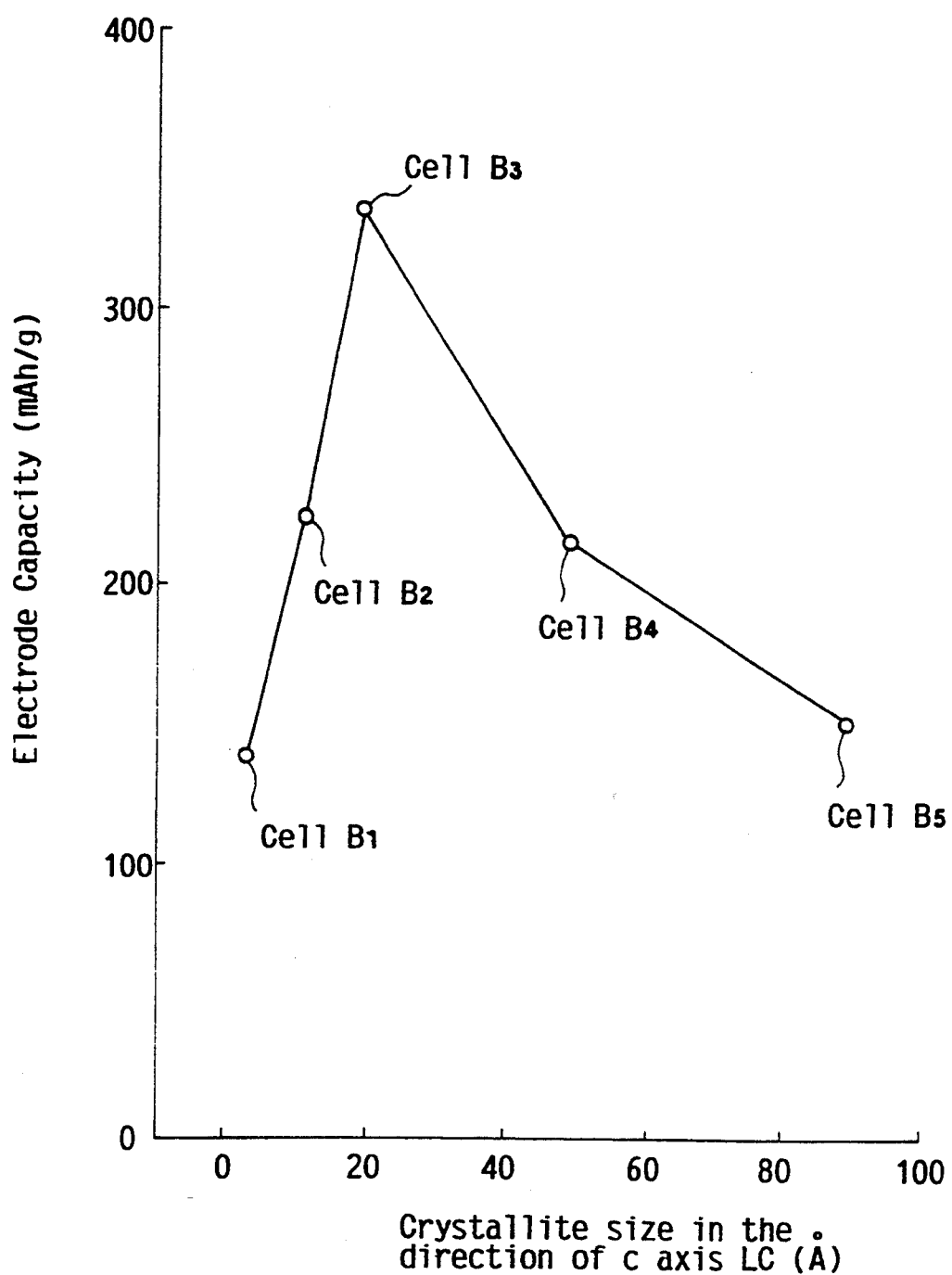
FIG. 6 is a graph showing a correlation between the crystallite size in the direction of c axis Lc of the carbon material and electrode capacity of Cells (B1) to (B5) of the present invention.

It is apparent from viewing FIG. 6 that a larger discharge capacity was retained in Cells (B2) to (B4) of the present invention, each having the crystallite size in the direction of c axis Lc of 15Å, 22Å, and 50Å, respectively, compared to the Cells (B1) and (B5) of the present invention.

EXPERIMENT 2

A study of charge/discharge cycle characteristics was carried out in Cells (B1) to (B5). The cells were charged and discharged in the same current and voltage applied in the Experiment 1 of the Embodiment I.

Figure 7:
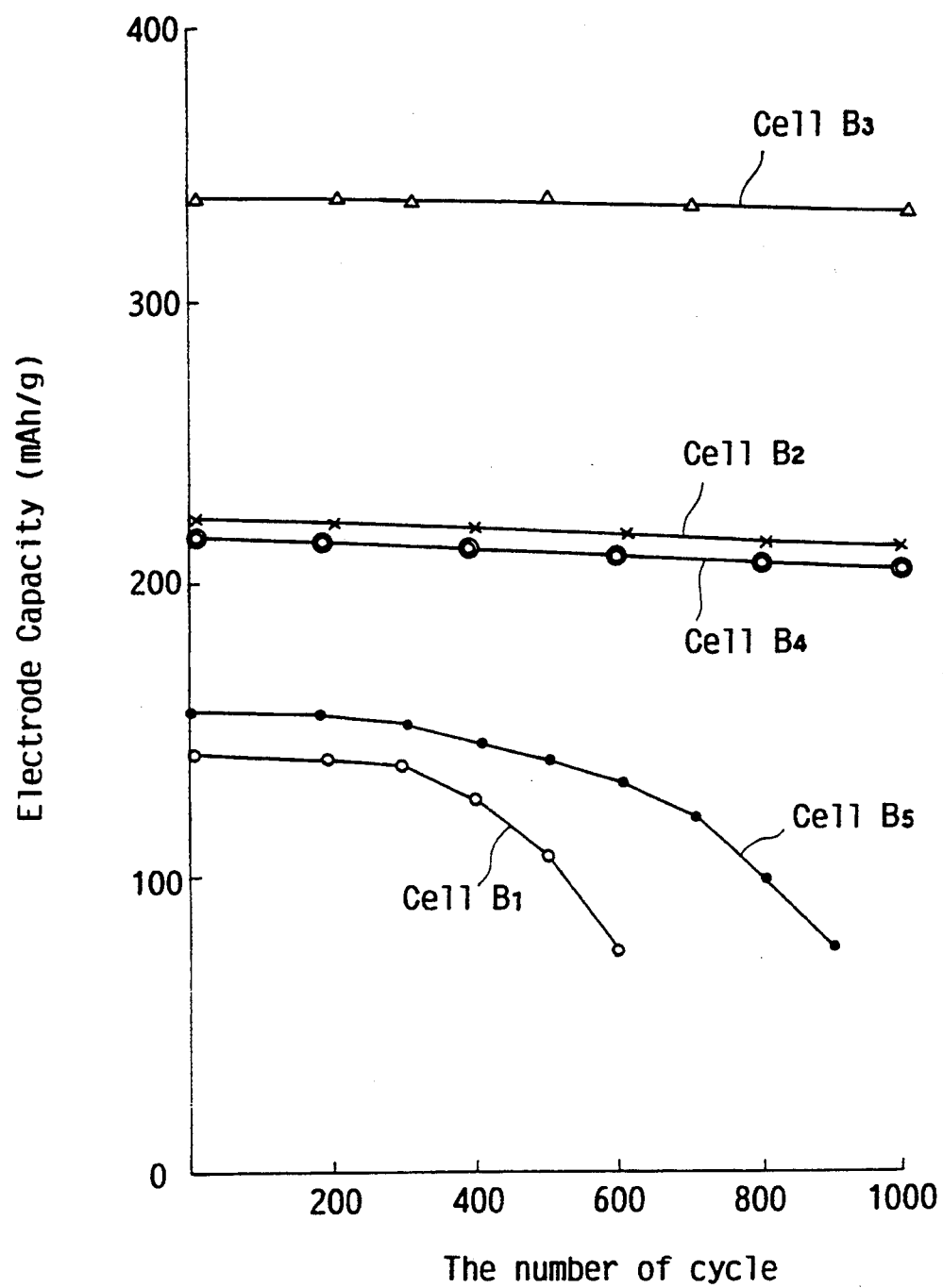
FIG. 7 is a graph showing the charge/discharge cycle characteristics of Cells (B1) to (B5) of the present invention.

It is apparent from viewing FIG. 7 that superior charge/discharge cycle characteristics were retained in Cells (B2) to (B4) of the present invention, each having the crystallite size in the direction of c axis Lc of 15Å, 22Å, and 50Å, respectively, compared to the Cells (B1) and (B5) of the present invention.

CONCLUSION OF THE EXAMPLES 1 AND 2

From the results of Experiments 1 and 2, it was confirmed that not only a larger discharge capacity was obtained but also the charge/discharge cycle characteristics were improved further in the secondary cell of the present invention, wherein the ranges of the crystallite size in the direction of c axis Lc in addition to the spacing of (002) planes $d_{002}$ and true density of the carbon material used for the negative electrodes were restricted to 10Å to 50Å, 3.39Å to 3.62Å and 1.70 g/cc to 2.20 g/cc, respectively.

(EMBODIMENT III)

EXAMPLES 1 TO 6

Six cells were produced by the same method described in the Example 1 of the Embodiment I except for the differences in properties of the carbon material such as a specific surface area S, the true density and spacing of (002) planes $d_{002}$ and in hours for pulverization as shown in Table 3.

The cells produced as above are referred to as Cells (C1) to (C6), respectively hereinafter.

TABLE 4

| Cell | C1 | C2 | C3 | C4 | C5 | C6 |
| --- | --- | --- | --- | --- | --- | --- |
| Specific surface area S(m²/g) | 0.5 | 1 | 2 | 22 | 50 | 80 |
| True density (g/cc) | 2.02 | 2.01 | 2.02 | 2.02 | 2.01 | 2.02 |
| Spacing of (002) planes $d_{002}$ (Å) | 3.48 | 3.47 | 3.48 | 3.48 | 3.49 | 3.48 |
| Hours for pulverization (hr) | 1 | 3 | 5 | 7 | 10 | 30 |

EXPERIMENT 1

A study of the correlation between the specific surface area S and the electrode capacity was carried out in Cells (C1) to (C6). The cells were charged and discharged in the same current and voltage applied in the Experiment 1 of the Embodiment I.

Figure 8:
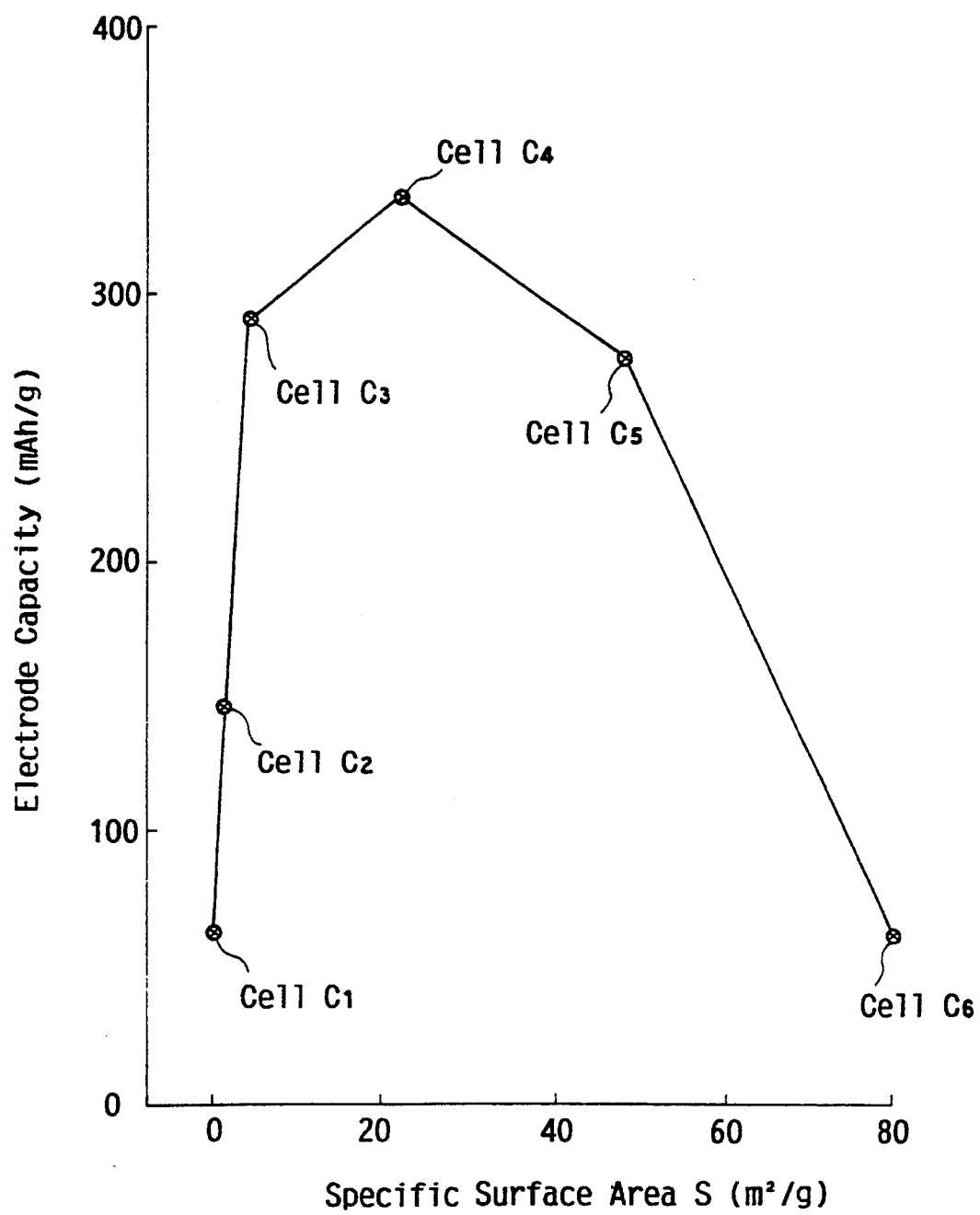
FIG. 8 is a graph showing a correlation between the specific surface area S of carbon materials and electrode capacity of Cells (C1) to (C6)

It is apparent from viewing FIG. 8 that a larger discharge capacity was retained in Cells (C3) to (C5) of the present invention, each having the specific surface area S of 2 m$^2$/g, 22 m$^2$/g, and 50 m$^2$/g, respectively, compared to the Cells (C1), (C2), and (C6) of the present invention.

EXPERIMENT 2

A study of charge/discharge cycle characteristics was carried out in Cells (C1) to (C6). The cells were charged and discharged in the same current and voltage applied in the Experiment 1 of the Embodiment I.

Figure 9:
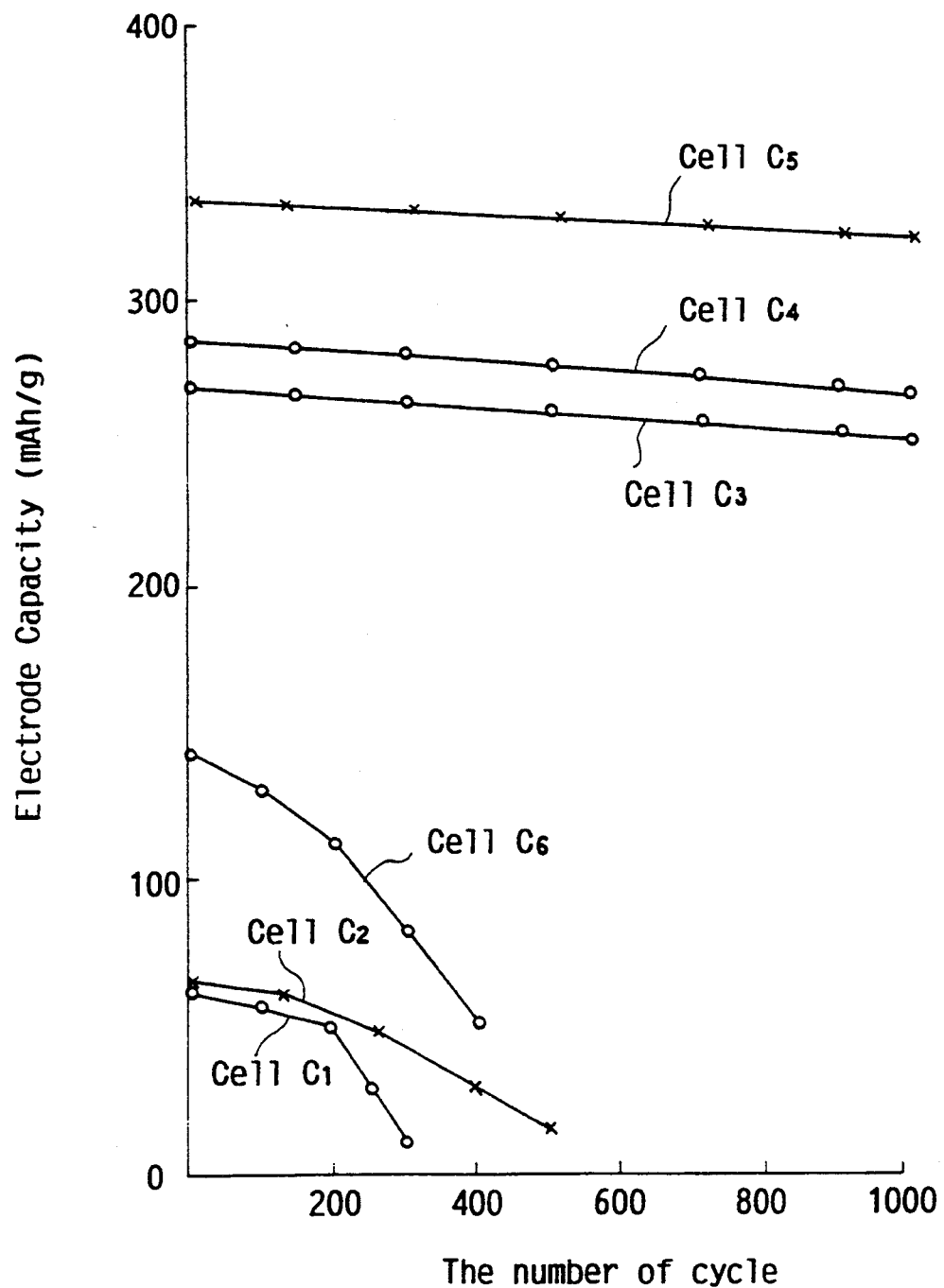
FIG. 9 is a graph showing the charge/discharge cycle characteristics of Cells (C1) to (C6) of the present invention.

It is apparent from viewing FIG. 9 that superior charge/discharge cycle characteristics were retained in Cells (C3) to (C5) of the present invention, each having the specific surface area S of 2 m$^2$/g, 22 m$^2$/g, and 50 m$^2$/g, respectively, compared to the Cells (C1), (C2), and (C6) of the present invention.

CONCLUSION OF THE EXPERIMENTS 1 AND 2

From the results of Experiments 1 and 2, it was confirmed that not only a larger discharge capacity was obtained but also charge/discharge cycle characteristics were improved further in the secondary cell of the present invention, wherein the ranges of the crystallite size in the direction of c axis Lc or specific surface area S, spacing of (002) planes d$_{002}$, and true density of the carbon material used for the negative electrodes were restricted to 10Å to 50Å, 2 m$^2$/g to 50 m$^2$/g, 3.39Å to 3.62Å, and 1.70 g/cc to 2.20 g/cc, respectively.

In the Embodiments I, II and III of the present invention, although manganese oxides were utilized as the active material for the positive electrode, oxides other than manganese oxides, conductive polymers, sulfides or the like can be also utilized. These alternatives are CDMO, MoO2, TiO2, V2O5, CoO2 or oxides obtained by partly replacing the aforementioned compounds; polyaniline, polypyrrole, polythiophene, polyparaphenylene, polyacetylene or conductive polymers obtained by partly replacing the aforementioned compounds; and TiS2, MoS2, NbS2, VS2, or sulfides obtained by partly replacing the aforementioned compounds.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A secondary cell comprising an electrode consisting essentially of a carbon material wherein the spacing of (002) planes d$_{002}$ and true density of the carbon material are from 3.39Å to 3.62Å and from 1.70 g/cc to 2.20 g/cc, respectively.

2. The secondary cell of claim 1, wherein the electrode is a negative electrode.

3. The secondary cell of claim 1, wherein crystallite size in the direction of c axis Lc of the carbon material is from 10Å to 50Å.

4. The secondary cell of claim 1, wherein specific surface area of the carbon material is from 2 m$^2$/g to 50 m$^2$/g.

5. The secondary cell of claim 1, wherein the carbon material is fabricated from at least one member selected from the group consisting of needle cokes, pitch cokes, and furfuryl alcohol.

6. A secondary cell having a carbon material for an electrode, wherein the electrode is produced by a process comprising:
heating the carbon material at a temperature of from 800° C. to 1500° C., such that the spacing of (002) planes d$_{002}$ and true density of the carbon material are from 3.39Å to 3.62Å and from 1.70 g/cc to 2.20 g/cc, respectively;
pulverizing the carbon material after heating in a gas ambience; and
fabricating the electrode consisting essentially of the carbon material.

7. The secondary cell of claim 6, wherein crystallite size in the direction of c axis Lc of the carbon material is from 10Å to 50Å.

8. The secondary cell of claim 6, wherein specific surface area of the carbon material is from 2 m$^2$/g to 50 m$^2$/g.

9. The secondary cell of claim 6, wherein the carbon material is fabricated from at least one member selected from the group consisting of needle cokes, pitch cokes, and furfuryl alcohol.

10. The secondary cell of claim 1, wherein the carbon material contains lithium ions.

11. The secondary cell of claim 6, wherein the carbon material contains lithium ions.

12. A negative electrode for a secondary cell consisting essentially of a carbon material wherein the spacing of (002) planes d$_{002}$ and true density of the carbon material are from 3.39Å to 3.62Å and from 1.70 g/cc to 2.20 g/cc, respectively.

13. The negative electrode of claim 12, wherein crystallite size in the direction of c axis Lc of the carbon material is from 10Å to 50Å.

14. The negative electrode of claim 12, wherein specific surface area of the carbon material is from 2 m$^2$/g to 50 m$^2$/g.

15. The negative electrode of claim 12, wherein the carbon material contains lithium ions.

16. A process for making a negative electrode useful in a secondary cell comprising the steps of:
heating a carbon material at a temperature of from 800° C. to 1500° C., such that the spacing of (002) planes d$_{002}$ and true density of the carbon material are from 3.39Å to 3.62Å and from 1.70 g/cc to 2.20 g/cc, respectively;
pulverizing the carbon material after heating in a gas ambience; and
fabricating the electrode consisting essentially of the carbon material.

17. The process of claim 16, wherein crystallite size in the direction of c axis Lc of the carbon material is from 10Å to 50Å.

18. The process of claim 16, wherein specific surface area of the carbon material is from 2 m$^2$/g to 50 m$^2$/g.

19. The process of claim 16, wherein the carbon material contains lithium ions.

20. A negative electrode consisting essentially of a crystalline carbon material having a spacing of (002) planes d$_{002}$ of 3.39Å to 3.62Å and a true density of 1.70 g/cc to 2.20 g/cc.

21. The negative electrode of claim 20, wherein the carbon material has a crystallite size in the direction of c axis Lc of 10Å to 50Å.

22. The negative electrode of claim 20, wherein the carbon material has a surface area of 2 m$^2$/g to 50 m$^2$/g.

23. A secondary cell comprising the negative electrode of claim 20.

24. A secondary cell comprising the negative electrode of claim 21.

25. A secondary cell comprising the negative electrode of claim 22.

26. A negative electrode prepared by a process comprising the steps of:
   (a) heating in an inert Gas atmosphere and at a temperature of 800° C. to 1500° C. crystalline carbon material having a spacing of (002) planes d$_{002}$ of 3.39Å to 3.62Å and a true density of 1.70 g/cc to 2.20 g/cc to make a heat-treated material;
   (b) pulverizing the heat-treated material to make a pulverized material; and
   (c) forming the negative electrode from the pulverized material.

27. The negative electrode of claim 26, wherein the heating step effects a crystallite size in the direction of c axis Lc of 10Å to 50Å.

28. A negative electrode of claim 26, wherein pulverizing the heat-treated material effects particles having a surface area of 2 m$^2$/g to 50 m$^2$/g.

29. The negative electrode of claim 26, wherein the crystalline carbon material is selected from the group consisting of needle cokes, pitch cokes, and furfuryl alcohol.

30. In a secondary cell having a negative electrode, the improvement wherein the negative electrode is the negative electrode of claim 26.

31. In a secondary cell having a negative electrode, the improvement wherein the negative electrode is the negative electrode of claim 27.

32. In a secondary cell having a negative electrode, the improvement wherein the negative electrode is the negative electrode of claim 28.

33. In a secondary cell having a negative electrode, the improvement wherein the negative electrode is the negative electrode of claim 29.

* * * * *

UNITED STATES PATENT AND TRADEMARK OFFICE
CERTIFICATE OF CORRECTION

PATENT NO.   :   5,378,561
DATED        :   January 3, 1995
INVENTOR(S)  :   Nobuhiro FURUKAWA et al.

It is certified that error appears in the above-identified patent and that said Letters Patent is hereby corrected as shown below:

Column 1, line 11, please delete "researches" and insert therefor --research--.

Column 2, line 13, please change "ambient gas" to --an inert gas atmosphere--.

Column 2, line 19, please delete "A" and insert therefor --The--.

Column 4, line 13, after the phrase "A study of", please delete "a" and insert therefor --the--.

Column 5, line 15, please delete "A" and insert therefor --The--.

Signed and Sealed this

Nineteenth Day of September, 1995

Attest:

BRUCE LEHMAN

*Attesting Officer*  *Commissioner of Patents and Trademarks*